United States Patent
Mooneyham

(10) Patent No.: US 8,775,321 B1
(45) Date of Patent: Jul. 8, 2014

(54) SYSTEMS AND METHODS FOR PROVIDING NOTIFICATION OF AND ACCESS TO INFORMATION ASSOCIATED WITH MEDIA CONTENT

(75) Inventor: Mark Randall Mooneyham, Folsom, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1097 days.

(21) Appl. No.: 12/262,732

(22) Filed: Oct. 31, 2008

(51) Int. Cl.
*G06Q 20/00* (2012.01)

(52) U.S. Cl.
USPC ............ 705/67; 705/65; 705/64; 705/50; 705/44; 380/229; 713/155; 713/156; 713/157; 713/158; 713/159

(58) Field of Classification Search
USPC ............................................... 705/67
See application file for complete search history.

(56) References Cited

U.S. PATENT DOCUMENTS

| | | | |
|---|---|---|---|
| 7,046,956 B1 | 5/2006 | Cohen | |
| 2001/0044840 A1* | 11/2001 | Carleton | 709/223 |
| 2003/0023561 A1* | 1/2003 | Stefik et al. | 705/51 |
| 2005/0251749 A1* | 11/2005 | Lamkin et al. | 715/719 |
| 2006/0244845 A1 | 11/2006 | Craig et al. | |
| 2009/0328101 A1* | 12/2009 | Suomela et al. | 725/40 |

FOREIGN PATENT DOCUMENTS

JP  2002196985 A  *  7/2002  ............ G06F 12/14

OTHER PUBLICATIONS

"Extensible Metadata Platform," http://en.wikipedia.org/wiki/Extensible_Metadata_Platform, downloaded from the Internet on Apr. 4, 2008.
"How Clearplay Works," http://www.clearplay.com/Movies/HowClearPlayWorks.aspx, downloaded from the Internet on Aug. 21, 2008.
"ClearPlay—Parental Control," http://www.clearplay.com/About.aspx, downloaded From the Internet on Aug. 21, 2008.
"Motion Picture Association of America," http://www.mpaa.org/filmratings.asp downloaded from the Internet on Jun. 5, 2008.
"V-Chip—Wikipedia, the free encyclopedia," http://en.wikipedia.org/wiki/V_chip, downloaded from the Internet on Jul. 23, 2008.

* cited by examiner

*Primary Examiner* — James A Reagan
(74) *Attorney, Agent, or Firm* — Kilpatrick Townsend & Stockton LLP

(57) ABSTRACT

Certain embodiments provide a user notification such as a cue in a media content player. The notification or cue indicates that there is additional content available for a piece of media being played or about to be played. The notification or cue may be superimposed on content or provided separate from the media content being provided. In certain embodiments, the notification may provide a link for accessing the additional content the notification identifies. For example, the user may click on a notification to link to a dynamically-generated webpage comprising information retrieved about the media content being presented.

28 Claims, 7 Drawing Sheets

SYSTEMS AND METHODS FOR PROVIDING NOTIFICATION OF AND ACCESS TO INFORMATION ASSOCIATED WITH MEDIA CONTENT

FIELD

Embodiments of the present disclosure relate generally to media content, information about media content, and the distribution and use of media content.

BACKGROUND

Audio, video, documents, television shows, advertisements, other rich media, and other media content can spread quickly through networks, computing devices, and other electronic media consuming devices and systems. Because media content can be distributed by multiple distributors on networks and other systems, information about the media content is often spread out and unconnected. For example, different user comments and reviews about a given piece of media content may appear on different websites hosting the media content among other places. A viewer consuming the content through one distributor may not be aware that additional information about the content is available at other locations.

Similarly, media content tends to lose touch with its creator once the content is out of its creator's hands. For example, a file containing media content may be distributed on the Internet, among other places, by a social media website where many viewers may consume the content without knowing the identity of the content creator or how to contact the content creator or other content source. While some content may include a credit portion, locating or contacting a content creator or content source may still be difficult. The credit portion of a piece of media content may be removed, overlooked, or disregarded by a content consumer. Even if the content includes a uniform resource locator (URL) address, a content consumer must locate such a URL address within the content and enter it correctly into a web browser.

Generally, content consumers often desire to learn more about the media content they consume and, in some cases, look at and provide feedback, comments, and other information about the content for others to view. Content creators and content sources, similarly, may want to provide information and receive feedback information from content consumers and other information about how the content they create or provide is being consumed. In many cases, content consumers and content creators/sources must search to identify one another and, in many cases, cannot identify one another and may not have an easy forum in which they can contact one another. In addition, because information about a piece of media can be distributed by multiple distributors, viewers may overlook or not have access to information about content found in sources other than their own content consuming environment.

SUMMARY

Certain embodiments provide a user notification such as a cue in a media content player. The notification or cue indicates that there is additional content available for a piece of media being played or about to be played. The notification or cue may be visual, audible, or some combination of visual and audible and it may be superimposed on content or provided separate from the media content being provided. In certain embodiments, the notification may provide a link for accessing the additional content the notification identifies. For example, the user may click on a notification to link to a dynamically-generated webpage comprising information retrieved about the media content being presented.

One exemplary method comprises receiving media content for use on a media player and determining a media identifier associated with the media content. The media identifier is different from media identifiers associated with other media content. The method further comprises using the media identifier to determine whether there is information associated the media content available separately from the media content. The media player plays the media content and, if there is information available, provides a notification that there is information associated the media content available.

Another exemplary embodiment also comprises determining a media identifier associated with media content and using the media identifier to determine whether there is information associated with the media content available separately from the media content. A media player provides the media content and provides a selectable link with the media content. The provision of the selectable link provides an indication that there is information associated with the media content available and selection of the selectable link provides access to the information associated with the media content that is available.

Another exemplary embodiment comprises receiving a request identifying media content. For example, the request may be received from a requestor using a website to access media content and having selected a link to access additional information about the media content. The request comprises a media identifier that is used to determine whether information associated with the media content is available and then provide the requestor with an indication of whether information associated with the media content is available. If information associated with the media content is available, the method involves providing the information associated with media content for provision to the requestor. For example, the requestor may be sent a uniform resource locator URL address for a dynamically-generated webpage that will present the information about the media content.

In other embodiments, a computer-readable medium (such as, for example, random access memory or a computer disk) comprises code for carrying out these methods.

These embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Figure 1:
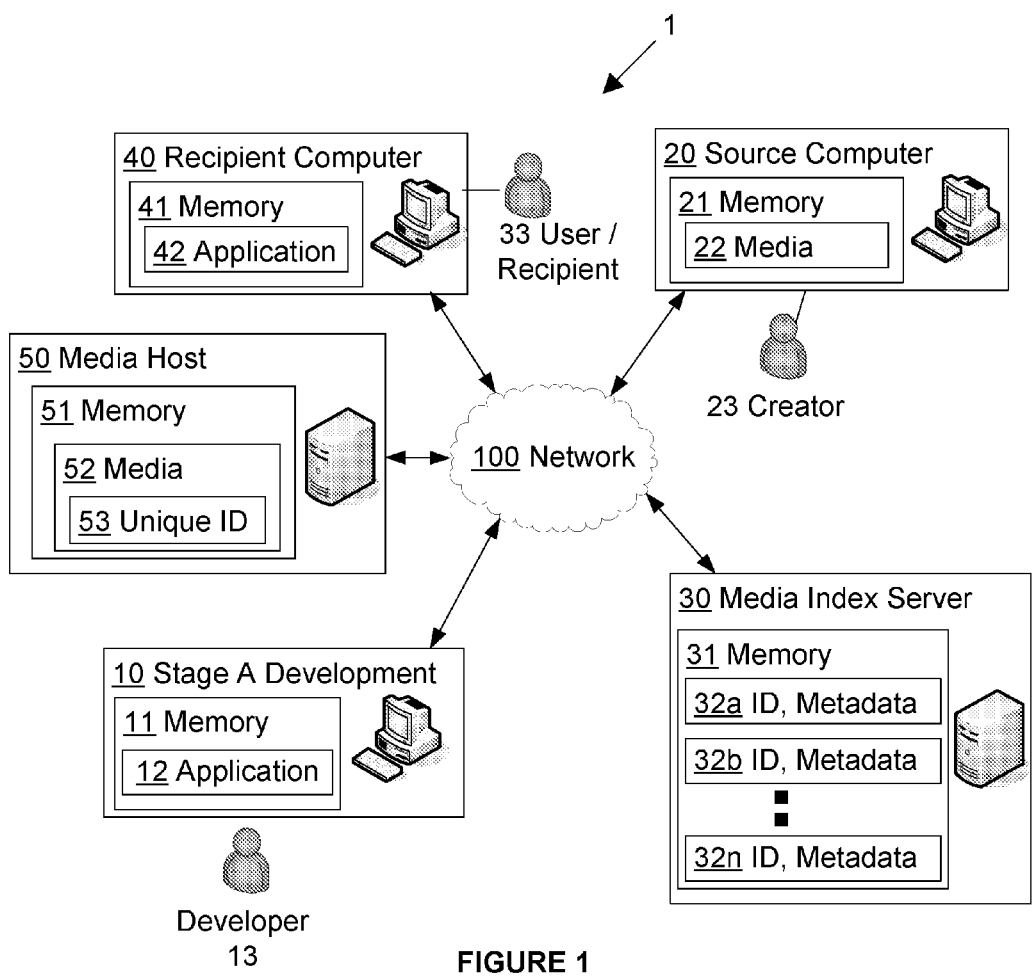
FIG. 1 is a system diagram illustrating an exemplary network environment.

The following specific illustrative embodiment is provided to introduce certain features of certain embodiments of the present disclosure and to illustrate some of the applications, uses, and benefits of various features. In this exemplary embodiment, a user navigates a web browser to a website that distributes video content developed by third parties. The user identifies a video and selects to view the video using the website. The website launches an embedded video player to play the selected video. The video player receives the selected video and identifies that the video has a unique identifier, in this example, a watermark, and sends a request to a remote server to determine whether there is additional information available about the selected video. In this example, there is additional information about the video and this additional information available to the user.

Knowing that there is additional information available, the video player provides a cue, such as a displayed flag, that indicates to the user that there is additional content. The video player also provides an option for the user to access the additional content about the video. In this example, the cue is provided as a display flag that the user can click on to access the additional information about the video. When the user clicks on the flag, a dynamic web page is separately launched to display the additional information to the user. The dynamic webpage retrieves additional information about the video using the unique identifier and displays the information for the user to view and, in this case, add to. For example, the user is able to add a user comment to the information about the video. When the user adds the comment the comment is sent for storage and/or use with the other information about the video.

In this example, the information about the video includes reviews, ratings, tags, rights information, publisher information, information about the creation of the video, advertisements, stills, comments, charts, views, demographics, geographic information, information about what websites the video is available on, information about the video creator, information about the video viewers and other information. The dynamic webpage displaying this information provides a user interface for the user to add information and communicate with others interested in or otherwise associated with the media content. For example, the user may provide a rating or a comment or send a message to the content creator. The dynamic webpage may be controlled by a central authority, by the video's content creator or publisher, or by any suitable party. The content creator or publisher may use the dynamic webpage to provide additional information about the video, such as restrictions on use, credits information, legal disclaimers, among other things.

This illustrative example is given to introduce the reader to the general subject matter discussed herein and is not intended to limit the scope of the disclosed concepts. The following sections describe various additional embodiments and examples of methods and systems for providing notification of and/or access to information associated with media content.

Illustrative Notifications and Links to Information about Media Content

Certain embodiments of the present disclosure provide a notification that there is information about a given piece of media content and, in some cases, information available from a centrally-located or maintained repository. A media content player may recognize an identifier within the media content and use that identifier to determine that there is additional information available for the media and present a notification that there is additional information available. For example, during playback of a video with a media player, a unique identifier embedded in the video may be recognized, causing a cue such as a displayed flag to be presented with the video. When the user clicks on the cue, metadata associated with the video is presented to the user, e.g., on the video player or in a separate web page. Metadata is any information associated with or about the media content. In some embodiments, a repository of metadata is used to provide metadata for media content. Some of this metadata may be associated with or provided by the creator or source of the media content. The metadata may be presented to a user on an interface that allows the viewer to post a review or other messages or feedback. Such user provided information may be added to the metadata. Accordingly, in certain embodiments, information about a piece of media is stored in a location that is not specific to the viewing/distribution environment (e.g., the particular website used to download the content). Instead, viewers can access and add to a central repository of information for the media content they consume.

A media consuming device or player that plays media may be intelligent and recognize media content, such as, for example, by recognizing a unique identifier stored in the media content. A unique identifier that is stored in a piece of media content may be used to contact a repository of metadata to determine whether there is metadata that is available for use by content viewers (e.g., whether an additional content flag should be presented). The unique identifier may also be used to retrieve metadata associated with the media content that is being consumed from the repository of metadata information. Such a repository may comprise one or more records associating the unique identifier with metadata for the media content. The unique identifier may function as an index so that metadata information can be easily retrieved. A repository may contain multiple entries for a given piece of media, e.g., entries relating to metadata from the media's development and entries relating the content and use of the media including, but not limited to, information about the content of the media, how the media was made, rights in the media, and other metadata. In certain embodiments, each entry in the index of media identifiers includes the media identifier. This media identifier can be used to retrieve the metadata associated with the media. A media identifier may be included within media content in any suitable manner, including but not limited to, within a watermark, embedded metadata, or a fingerprint of the media content. Additional examples of identifier and metadata repositories are found in U.S. patent application Ser. No. 12/101,621 filed Apr. 11, 2008 entitled "SYSTEMS AND METHODS FOR ASSOCIATING METADATA WITH MEDIA," incorporated herein in its entirety by this reference.

Certain embodiments connect content creators/publishers with the viewer of their content, even when the content has gone through one or more intermediaries on the Internet. Certain embodiments provide an avenue for content creators/publisher to provide information after publication and to express their intent behind the media, their rights, and otherwise control and monitor the use of media content. Certain embodiments provide mechanisms for content viewers to identify, locate, and communicate with content creator, for example, to find additional content created by a given content creator.

Illustrative Network Configuration

Referring now to the drawings in which like numerals indicate like elements throughout the several Figures, FIG. 1 is a system diagram illustrating an illustrative network environment according to certain embodiments. Other embodiments may be utilized since media content can be distributed in a variety of ways. The environment 1 shown in FIG. 1 comprises a wired or wireless network 100 connecting various network devices 10, 20, 30, 40, 50. Applications that execute on each of the devices 10, 20, 30, 40, 50 are shown as functional or storage components residing in memory 11, 21, 31, 41, 51 on the respective devices. As is known to one of skill in the art, such applications may be resident in any suitable computer-readable medium and execute on any suitable processor. For example, the network devices 10, 20, 30, 40, 50 shown each may comprise a computer-readable medium such as a random access memory (RAM) 11, 21, 31, 41, 51, coupled to a processor that executes computer-executable program instructions stored in memory 11, 21, 31, 41, 51. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

The source 20 may publish media 22, for example, by making media 22 available at one or more locations on the network 100. The media may have been created by one or more creators. Exemplary creators include media designers and developers, individuals involved in film creation, photography, animation, and many other forms of creative expression and development.

The media host server 50 may obtain a copy 52 of the media 22 and distribute copies to one or more requesting devices or otherwise. For example, a user/recipient 33 on a recipient device 40 may request the media, e.g., for download, streaming, or other consumption. The recipient computer 40 may comprise a player application 42 that functions as a media consuming device or player to allow the user 33 to view or otherwise consume the media 22.

The player application 42 may recognize a unique identifier 53 within the copy of the media 52 and use that unique identifier 42 to determine whether there is additional information available for the media 22. For example, the existence of the identifier 53 itself may signal that there is additional content available. Alternatively, the unique identifier may signal that there is additional information and the player application 40 can use the identifier to determine whether such information is available. For example, the player application may send a message to a media index server 30 asking whether information about the media is available. The media index server may respond that the information is available. The player application 42 can then request the information from the media index server, e.g., from metadata records 32a-n, and provide the information to the user recipient, e.g., by launching a webpage with the information or by presenting the information with the presented media 22. The metadata records on the media index server may comprise records that each have a unique identifier each corresponding to some piece of media and metadata.

The player application 42 may launch an interactive interface for the user 33 to view and possibly add information about the media 22 and possibly contact the source computer. In certain embodiments, the unique identifier 53 of the media allows the user to contact the source 20 or creator 23 of the media 22. For example, the player application 42 may retrieve a URL address from the media index server 30 that links to a webpage provided by the source computer 20. Such a webpage may present information about the media 22, allow information to be added, or facilitate communication with the creator 23, among a variety of other features.

Illustrative Use of a Notification of Available Media Content Information

Certain embodiments provide a user notification such as cue in a media content player. The notification or cue indicates that there is additional content available for a piece of media being played or about to be played. The notification or cue may be visual, audible, or some combination of visual and audible and it may be superimposed on content or provided separate from the media content being provided. In certain embodiments, the notification may provide a link for accessing the additional content the notification identifies. For example, the user may click on a notification to link to a dynamically-generated webpage comprising information retrieved about the media content being presented.

In certain embodiments, the media player identifies the user or user device consuming the media content and identifies the media recipient to the media content information, e.g., providing information about the user or user device for inclusion with the other information about the media content, e.g., adding to the counts of users viewing the content in the state of California, viewing the content using website X, and viewing the content on a mobile device, as but a few examples. Thus, among other information, the metadata about a piece of media may provide information and statistics about the viewers of a piece of media. Additional techniques for identifying user and device attributes are described in U.S. patent application Ser. No. 12/127,981 titled "SYSTEMS AND METHODS FOR MONITORING CONTENT CONSUMPTION," filed on May 28, 2008, and incorporated herein in its entirety by this reference.

Figure 2A:
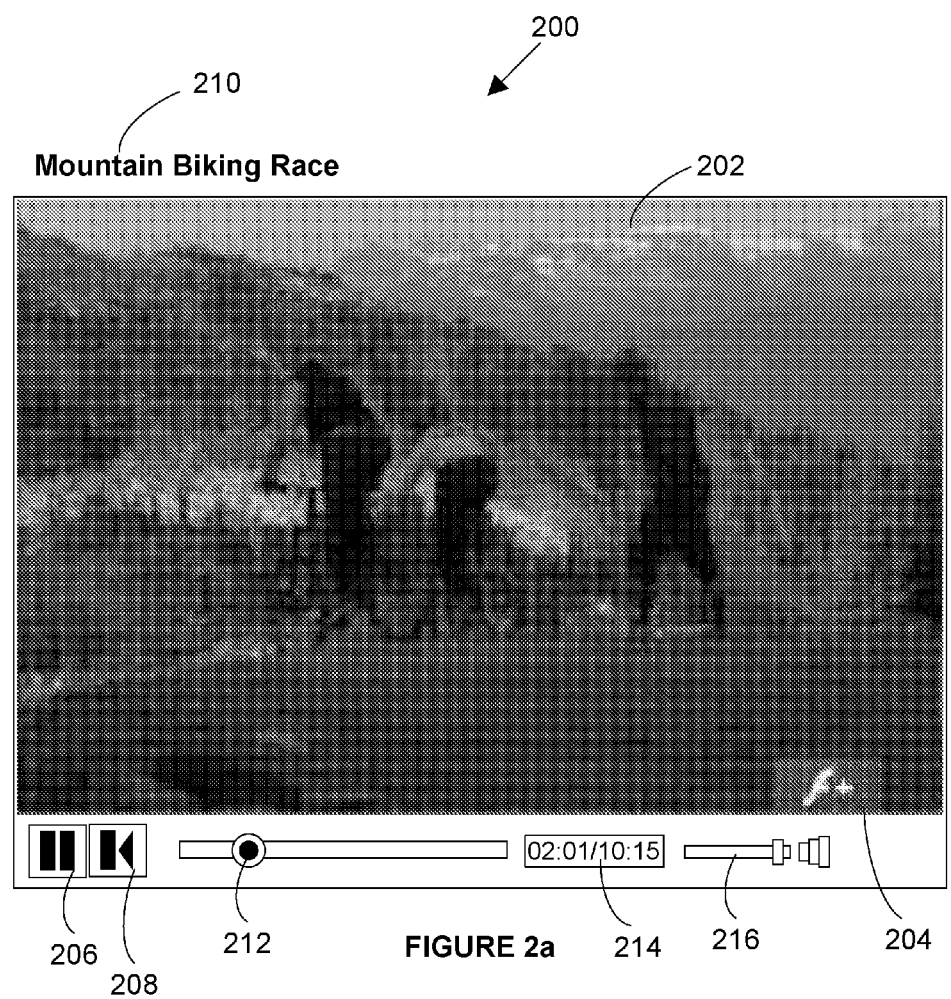
FIGS. 2a-c illustrate media content being presented with an exemplary notification linking to an exemplary dynamic web page of information associated with the media content.
Figure 2B:
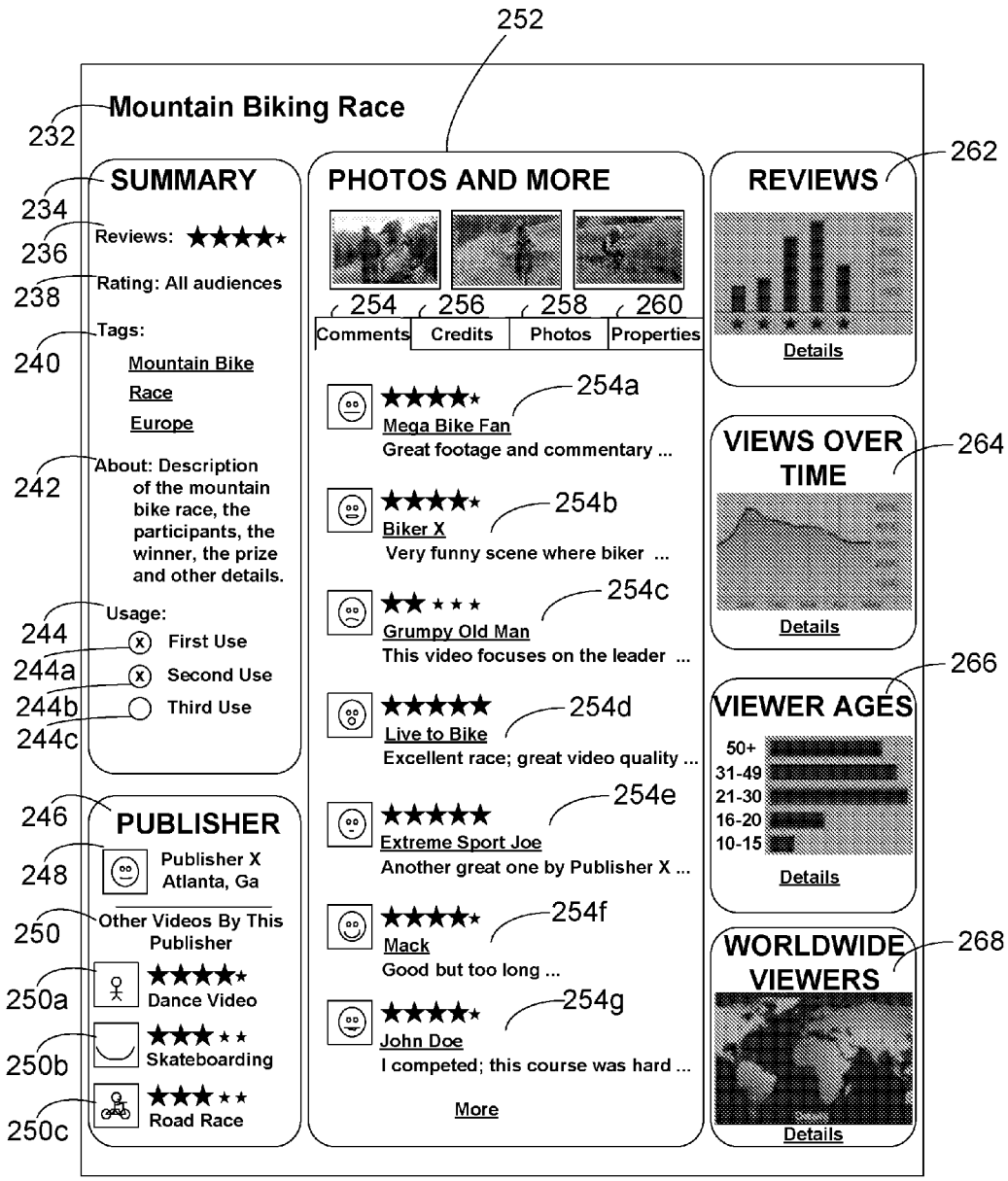
Figure 2C:
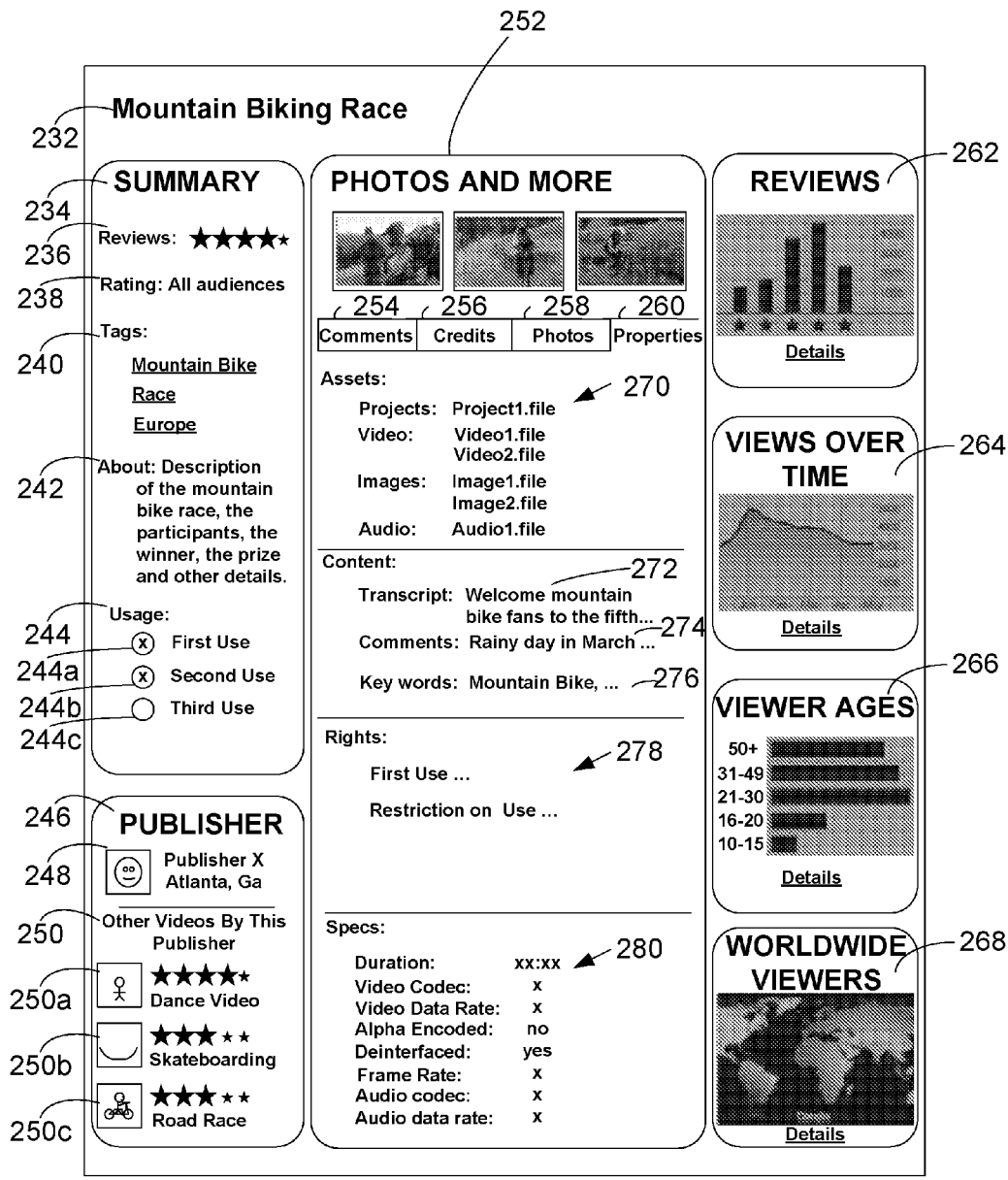

FIGS. 2a-c illustrate media content presented with an exemplary notification linking to an exemplary dynamic web page of information associated with the media content. FIG. 2a illustrates a media player 200 that may be provided as an embedded portion of a webpage, a stand alone application, as an application on a television or set top box, among a variety of other contexts. The media player presents media content 202 titled "Mountain Biking Race" 210. In this case, the media content 202 is video of a mountain biking race. The media player provides various tools 206, 208, 212 that allow a user to control the playing of the media content 202, an indicator of the video time 214, and a volume control 216. Other control tools, combinations of control tools, or no controls may be provided in a media content player.

As illustrated in FIG. 2a, a notification or cue 204 is presented with the media content 202. This notification tells a consumer of the media content (e.g., someone watching the video on the media player) that there is additional information available that is associated with this media content 202. In this case, the cue 204 provides a link to access this additional content. If the user clicks on the cue 204, a dynamically-generated webpage is generated that includes some or all of the additional information about the media content.

A media content player such as the media content player 200 of FIG. 2a may be a prolific software application that is used by consumers of media content receiving media content from multiple third parties, e.g., media content hosting websites, application providers, and others. In certain embodiments, providing additional information notification and linking through a media application ensures consistency and/or access to a single central source of information regardless of the media content's distribution route. For example, if a video is being played through a third party's website, the prolific media player technology may be required to actually view the content, e.g., by using a standard media player or a media player developed using the same underlying framework. The media player technology or framework may enforce rules such that notification and access is consistently provided from a single or centralized or common source (subject, in some cases, to a consumer turning the notification/access options off). Thus, in certain embodiments, there are advantages to providing notification and access at the media player level of content delivery and use.

In FIG. 2a, the media player 200 may have received a file containing the media content 202 for displaying as video content to the user. After receiving the file, the media player 200 recognizes that it has an ID number, uses the ID number to determine whether there is metadata available, and, if so, displays the cue 204 indicating that the additional information is available. For example, the media player 200 may send a request with the ID number to a remote server and receive a URL indicating that there is additional content available (and accessible at the provided URL). The cue may be a flag, a logo, a copyright icon, an image, text, or any other visual, audible, other indicator, or other type of notification. Attributes of the cue, such as its color, size, shape, etc., may indicate varying levels of content and a logo on the cue could indicate that the media content is copyrighted, has a given rating, or provide brief information about the content. The link and information accessed by the link may be based in part on where the user is within a piece of media content when a request for information is made, e.g., when the link is clicked. A server, for example, may return a URL and a list of frame numbers, e.g., if at frame 200 then the URL has this number on its end, etc.

FIG. 2b illustrates aspects of an exemplary dynamic webpage 230 generated when a user clicks on the cue 204 of FIG. 2a. Some or all of the content of this webpage 230 may be automatically generated out of a database of metadata about the media content 202. The webpage 230 may present the title of the media content 232 to indicate that it is a page dedicated to that particular content. The webpage 230 may present a summary section 234 that includes reviews 236, e.g., 4 out of 5 stars is the average, rating information 238, e.g., indicating that the content is provided for "All audiences," tag information providing specific tags associated with the media content, e.g., "Mountain Bike," "Race," "Europe," etc., a brief about description 242 of the content that may have been provided by the content creator or content source, and usage allowances/restrictions 244, e.g., indicating whether the content and/or information about the content can be used, for example, for a first use 244a, second use 244b, and/or third use 244c. Examples of usage and/or rights expressions include, among other things, entity and distribution restrictions, e.g., this content may not be used on or through Website X, and geographic restrictions, e.g., this content can only be played in North America.

The webpage 230 of FIG. 2b further illustrates the information about the publisher 246, including, as examples, the publisher's identity 248 and other videos by the publisher 250, including a list of a first other video 250a, a second other video 205b, and a third other video 250c. The publisher information may provide disclaimers and/or legal notifications and warnings.

The webpage 230 includes a "photos and more" section 252 including comments information 254, credits information 256, photos 258, and properties information 260 tabs. The illustrative comments portion 254 includes a list of comments 254a-g from consumers of the media content. The webpage 230 may provide an interface that allows a viewer to provide a comment, revise a comment, or provide additional information, among other things. A review chart 252 is provided that provides an additional bar chart representation of the reviews, e.g., showing the relative number of one star reviews, two star reviews, etc. Other analytics information can be presented as well. For example, the webpage 230 may present views over time information 264 illustrating how the viewing of the application has changed over time. Similarly, the webpage 230 may present information about viewer ages 266, perhaps derived using audience analytics techniques, and worldwide viewer location information 268, for example, using a map illustration. The webpage 230 may also include advertisements. The webpage may also show/rank what websites the video is being called from. The webpage 230 may also provide credit information, for example, identifying participants appearing within and involved in creating the video. The webpage 230 may comprise photos from the video or retrieved using the information about the video.

As illustrated in FIG. 2c, the webpage 230 may present a variety of types of property information 260. For example, asset information 270 may identify and, in some cases, provide access to specific files and other assets that went into making the media content 202 including, but not limited to, project files, video files, image files, and audio files. The property information 260 may also include content information including, but not limited to, scripts or transcripts 272, comments on content 274, key words 276, among other things. The property information 260 may also comprise rights information 278. Rights expression may be used to express a content creator's rights, e.g., specifying that the person or entity that is playing the content should insert specific information, avoid association with certain other content, and/or agree to a rights sharing arrangement. Rights expression may express a business model to create ad hoc viewing, distribution, advertising, and/or revenue sharing relationships. The property information 260 may also comprise specification information 280. Exemplary specification information 280 for a video includes, but is not limited to, information about duration, video codec, video data rate, whether it is alpha enhanced, whether it is disinterfaced, frame rate, audio code, audio data rate, among other things.

In alternative embodiments, a webpage is not used to display information about the media content. For example, information about the media content could be returned to the media player and displayed as part of the media player, e.g., as an over-lay. For example, a video may pause and the video area may become a window into the information about the media content. Thus, in certain embodiments, it is not necessary to launch a new webpage, browser, tab, etc. Retrieved metadata may be embedded on the page. For example, where a media player is embedded on a webpage, rather than triggering a call to a separate webpage, the media player may simply use its own display area. As another example, the information may be compressed or sequentially presented in a revolving area on a portion of the webpage or media player, e.g., as a text stream across the bottom of a personal computer or television display.

Illustrative Access to Content Creator and Source Information

Certain embodiments identify as available and/or provide access to expanded information about media content, e.g., on a creator link, author link, or source link. The user is able to go to a webpage that is controlled by the author and able to interact or get information. The webpage could also provide directly or provide via links other material by the same author or source. This allows an author or other content creator to promote their other material. Certain embodiments empower content creators so that that they are not completely disconnected from their audiences. User reviews can be communicated directly to a webpage controlled by the content creator or source and become part of the information associated with the media content. The reviews may enhance and add value to the media content. For example, any unique words entered by a reviewer, e.g., "this reminds me of film X" become new metadata and thus may be used as search terms in metadata searches. In this example, persons searching for "film X" may also find the piece of content with the reviewers comment likening it to film X, perhaps expanding the viewership of the piece of content.

Certain embodiments allow a content creator or source to selectively control which metadata is provided or made available as information associated with the media content through the media player notifications and links. A content creator may log into a control system and turn selectively control the exposure of various pieces of metadata. For example, information may be selectively provided based on recipient, e.g., distributor X is allowed to scrape information and use it to populate distributor X websites but distributor Y is prohibited from doing so.

In certain embodiments, a content creator may specify that if the media content is playing through distributor Z then do not allow access to additional information. For example, a content creator may use distributor X as an "official broker" and therefore provide the exclusive right to distribute X users to come and scrape the information about the media content. As another example, a television channel may put a code in its content and if someone is watching one of their shows through the television channel's own website the notification will not appear, but notification will appear on any other site. The television channel's own website may have automatically displayed information about the content, negating the need for the notification. Certain embodiments also provide different levels of access to metadata, e.g., only some sites have access to comments. And that differentiation could be based on the business model in which website is willing to engage.

A page could become a shared revenue opportunity between a content creator or source and the calling website, e.g., the distributor providing the content. The distributor could, for example, provide a link to an advertisement server as a source for advertisements presented with the information about the media content, e.g., advertisement on a dynamically-generated information page. Thus, some of or all of the advertisements on such a page may actually be identified from the distributor's server. Such a scenario, among others, presents revenue sharing opportunities and gives distributors and others an incentive to facilitate notification and access to additional information. In some cases, the additional information itself can be used to identify contextually-related advertisements that can than be provided with the additional information about the media content.

Illustrative Identifier and Metadata Repository

A variety of techniques may be employed to recognize a piece of media content and/or recognize that there is additional information available that is associated with the piece of media content. An identifier may be provided as part of a piece of media content as a watermark, visible mark, fingerprint, embedded metadata, or otherwise. That identifier can resolve to a database and that database can return information. An identifier can be used to determine whether there is additional information available for the media content and to retrieve or otherwise obtain access to such information. For example, the identifier may provide a mechanism for retrieving information from a repository of metadata about media content.

Figure 3:
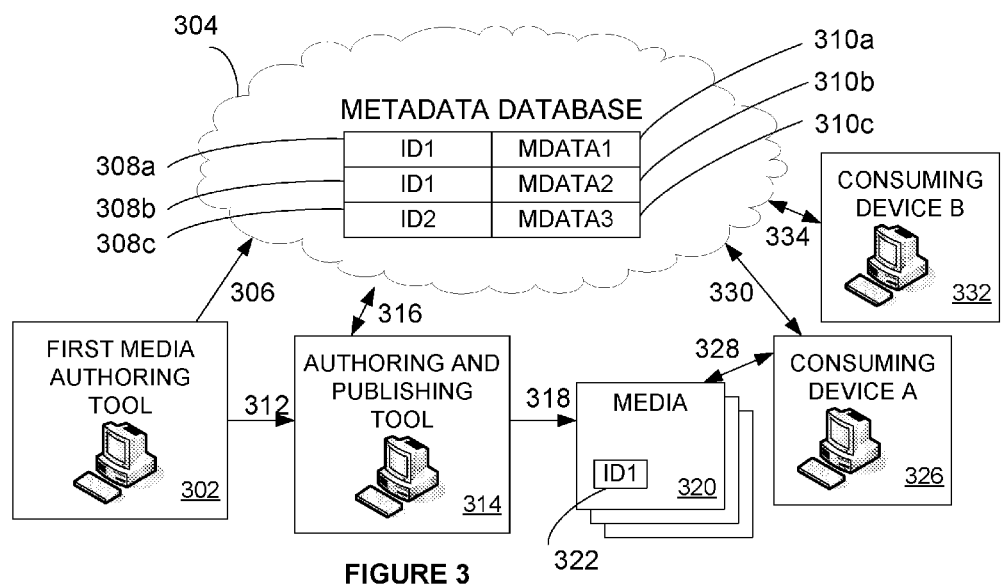
FIG. 3 is a flow diagram illustrating an exemplary media development and use environment.

FIG. 3 is a flow diagram illustrating an illustrative media development and use environment according to certain embodiments. In this example, a metadata repository or database 304 is used to facilitate metadata use. The first media processing tool 302 may be a rich media, text editor, audio or video editor, or any other suitable tool. The first media processing tool 302 comprises technology that receives metadata with its input content and/or derives metadata as content is created using the tool 302. The media output 312 of the media processing tool 302 is media in a first form, such as a file, in which a media identifier is incorporated, for example as embedded metadata or as a watermark, or preserved, for example, as a fingerprint. Because techniques such as fingerprinting may not change the media (e.g., a fingerprint may be derived from the existing media through analysis of pre-existing characteristics such as the color or brightness changes between frames), the media may be given a media identifier such as a derived fingerprint without changing the media file itself. The media identifier may be created by the first media processing tool 302 or may be provided by a media identifier generator (not shown).

As metadata is identified or created by the first media processing tool 302, one or more metadata entries 306 are sent to the metadata database 304. For example, a first entry comprising the media identifier of a first piece of media 308a and metadata 310a associated with that first piece of media may be sent to and stored in the metadata database 304. Similarly, another entry comprising the media identifier of a first piece of media 308b and different metadata 310b associated with that first piece of media may be sent to and stored in the metadata database 304. When the first media processing tool 302 is used to generate a different piece of media, a new media identifier may be created, and a third entry comprising the new media identifier of a second piece of media 308c and metadata 310c associated with that second piece of media may be sent to and stored in the metadata database 304.

Thus, in certain embodiments, a media identifier is created for a given media output 312 of the first media processing tool 302 and stored with metadata in a centralized or decentralized database 304. The media identifier is incorporated or otherwise provided with the media output 312 that is generated by the first media processing tool 302. The metadata that is stored in the database 304, such as metadata 310a-c, may also be embedded in the media output 312 itself.

In certain embodiments, the metadata database 304 is used as a centralized repository for metadata of media (and other objects). The database may be accessible on the Internet, to a limited work group, or otherwise made available. The database may be located on the developer's machine. In the case of multiple databases existing simultaneously, for example, on a developer's machine, at the workgroup level and a publicly available index of media identifiers, each database can replicate entries by communicating with the others and transferring the entries.

The media output 312 produced by the first media processing tool 302 may not be in final production form. One or more additional processing tools may be used to modify the media output 312 with the addition or modification of content, and may be used to identify and create additional metadata associated with the media output 312. For example, authoring and publishing tool 314 may take the media output 312 of the first media processing tool 302 as input. The authoring and publishing tool 314 can identify and use the media identifier incorporated in the media output 312. For example, authoring and publishing tool 314 can look up the metadata that is already associated with the media output 312 by sending and receiving communication 316 with the metadata database 304. Similarly, as authoring and publishing tool 314 is used to create or modify the content of the media, additional metadata may be identified and used to send additional entries to the metadata database 304.

The metadata created or identified at any stage of development or use may include information about the content, about the development of the content, about the source of the content, about author rights, about usage rights, and/or about any other topic for which metadata information may be useful.

The output 318 of authoring and publishing tool 314 may be a finalized media 320 that incorporates the media identifier 322 associated with the media's metadata in the metadata database 304. The media 320 may be in the same form as the media output of the first media processing tool 312, or may be in a completely different form. For example, the media output 312 of the first media processing tool may be a computer file having a text format that includes the script and scene information for a movie and the media 320 may be a video format file. As described above, development of a piece of media may involve multiple steps performed by multiple developers and the use of multiple content capturing, importing, editing, and distributing tools.

In FIG. 3, the finalized media 318 is made available to end consumers. In this example, a consuming device A 326 downloads the media 320 and plays the media for an end consumer. The consuming device A 326 is further used to retrieve metadata, for example, the script of the video, by the consuming device. This retrieval can be achieved in a variety of ways. For example, the consuming device A 326 may send and receive communications 330 with the metadata database 304 requesting metadata associated with the media's media identifier 322.

Another consuming device B 332 may perform a search by sending and receiving communications 334 with the metadata database 304. For example, an end user may search for content that includes a particular actor and the search may send a message 334 to the metadata database 304 asking for the media identifiers for all metadata that includes the actor's name. In response, the consumer device B 332 may receive one or more media identifiers, which may be used to locate or provide a list of media to which the media identifiers relate. For example, a standard Internet search for the one or more media identifiers may return media that has the media identifier incorporated (e.g., as a watermark or as embedded metadata).

A consuming device may be used to play back, deliver, and/or serve media content. Examples include a device with Adobe® Flash® software, a device using the Adobe® AIR® platform, a device using an Adobe® Acrobat® product, a set top box, or other media consuming fixed or portable devices. Such a component may play back media, get the incorporated media identifier from the media when necessary, and look up metadata when necessary. A consumption device could be a server that is serving out the media. In one embodiment, such a server device retrieves metadata for a piece of media and from the metadata identifies the subject matter of the media, e.g., that the media relates to hot rod cars. Another consumption device may be a social media web site which uses the digital identifier to look up usage rights information to determine if it has permission to distribute media files uploaded to it. The server device uses this information to serve media with one or more advertisements about cars. Thus, a metadata lookup could happen on either or both the delivery side or playback side of media consumption. In some embodiments, it may be desirable to cache copies of the metadata closer in the network topology to the point of playback, for instance at a social media site, a cable head end, a wireless provider's central office or at a content distribution network.

Figure 4:
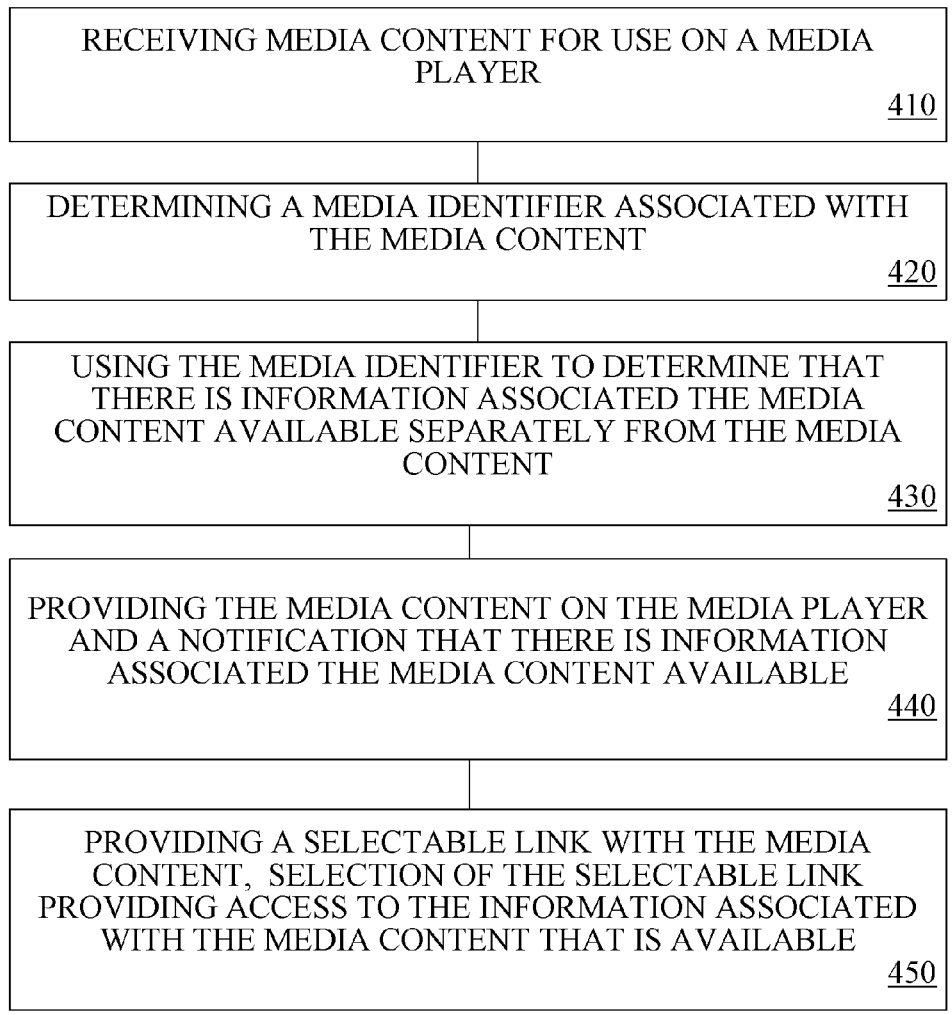
FIG. 4 is a flow chart illustrating an exemplary method of providing notification of and access to information associated with media content.

Exemplary Method of Providing Notification of and Access to Information Associated with Media Content FIG. 4 is a flow chart illustrating an exemplary method of providing notification of and access to information associated with media content. For purposes of illustration only, the elements of this method are described with respect to a particular implementation. A variety of other implementations are also possible.

In the method 400 shown in FIG. 4, a media player receives media content, as shown in block 410, and determines a media identifier associated with the media content, as shown in block 420. The media identifier is different from media identifiers associated with other media content. Generally the media identifier is unique enough so that the media content can be uniquely identified.

The method 400 further comprises using the media identifier to determine that there is information associated with the media content available separately from the media content, as shown in block 430. For example, the media player may send a query with the unique identifier asking a repository of metadata whether any metadata associated with the media content is available for use. The response may indicate that there is or is not such content available, provide some or all of this content, and/or provide a link to a location at which such content can be accessed if the content is available.

The method 400 further comprises providing the media content on the media player and providing a notification that there is information associated with the media content available, as shown in block 440. This may involve displaying the media content on a display portion of the media player and displaying the notification on the media player within and/or outside that display portion. Thus, the notification may overlap a portion of the media content as it is played, or paused, or is otherwise being provided. The notification may be visual, audible, or both. The notification may provide an indication of an amount of information associated the media content that is available. In addition, an attribute of the notification, such as its color, size, or shape, may provide an indication of an amount of the information associated with the media content that is available.

The method 400 may further comprise providing a selectable link with the media content, the selection of the selectable link providing access to the information associated with the media content that is available, as shown in block 450. The notification may be the selectable link. Selection of the link may cause a dynamically-generated web page to launch to display the information. The webpage may also allow a user to add information to the information associated with the media content.

Figure 5:
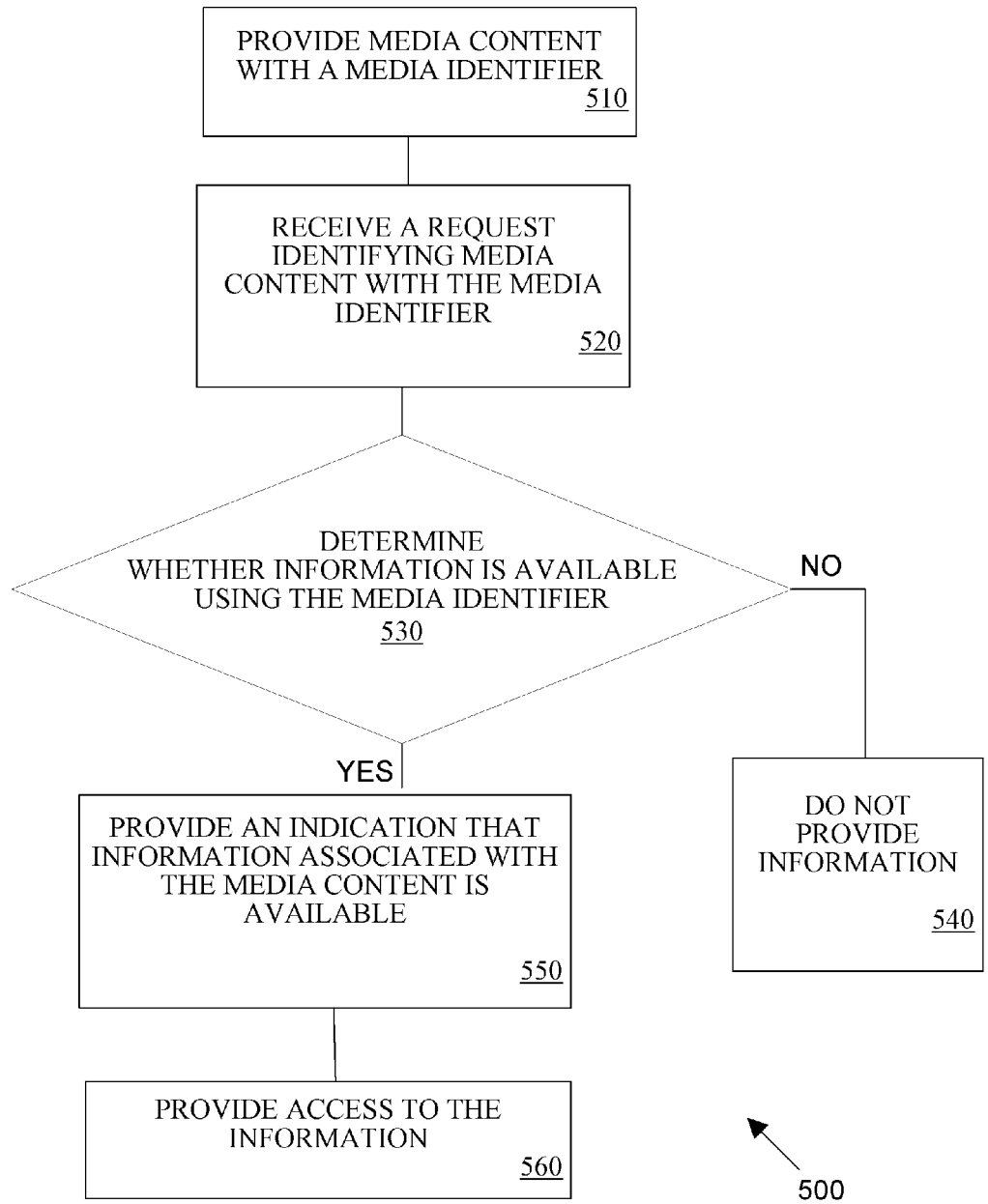
FIG. 5 is a flow chart illustrating an exemplary method of providing an indication that information associated with media content is available.

Exemplary Method of Providing an Indication that Information Associated with Media Content is Available FIG. 5 is a flow chart illustrating an exemplary method 500 of providing an indication that information associated with media content is available. The method 500 comprises providing media content with a media identifier, as shown in block 510. The media identifier may uniquely identify the media content so that it can be distinguished from other media content.

The exemplary method 500 further comprises receiving a request identifying the media content with the media identifier, as shown in block 520. The request may request confirmation that additional information is available. The request may further identify an individual responsible for the request such as a person viewing media content and desiring to view information about the media content. The request may identify a particular computer, distributor, application, or other attribute of the source of the request and/or information about if and how the media content was provided to a requester.

The exemplary method 500 further comprises determining whether there is information available using the media identifier, as shown at 530. This may involve accessing a database and looking for entries in the database corresponding to the media identifier, e.g., having the media identifier as a key. Determining whether information is available may comprise first determining whether there is information and, second, whether that information should be made available to a particular requester, requesting environment, application, or in the context of a particular mode of distribution of the media content associated with the request, e.g., the information may not be made available if the request is associated with the media content being displayed through a particular website. As additional examples, availability of information associated with the media content may be controlled by a content creator, may be dependent upon an identity of a requestor, may be dependent upon a distributor used to access the media content, or may be dependent upon existence of a contractual relationship involving the distributor. If the information is not available, the method 500 does not provide the information, as shown at block 540.

If the information is available, the method 500 involves providing an indication that the information associated with the media content is available, as shown in block 550. This indication may be displayed or used to display a notification with the media content that the information is available. Moreover, the information that is available may be provided as shown at block 560. For example, the information may be provided in response to receiving a request for the information. Alternatively, some or all of the information may be provided with, or as part of, the indication that information associated with the content is available.

Advertising information may be provided with the information about the media content. In some cases, such advertising may have been identified in the request, which may have been provided by the distributor that was used to access the media content. Certain embodiments provide methods of sharing revenue associated with advertising. For example, advertising revenue may be shared by a distributor, a content owner, and an entity making the information about the media content available.

In some embodiments, the method 500 shown in FIG. 5 may further comprise receiving additional information for association with the media content and associating the additional information with the media content. For example, a new entry may be created in a database of information. The new entry may include the media identifier so that it will be identified in response to future request for information associated with that media content.

General

Certain embodiments relate to an index of media identifiers that available over the Internet and provides an indication of whether information is available to media players playing media content with associated information in the index. Certain embodiments provide cues when information is available and/or links to available information. These embodiments are merely illustrative. In short, the techniques and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

In addition, with respect to the computer implementations depicted in the Figures and described herein, certain details, known to those of skill in the art have been omitted. For example, software tools and applications that execute on each of the devices and functions performed thereon are shown in FIG. 1 as functional or storage components on the respective devices. As is known to one of skill in the art, such applications may be resident in any suitable computer-readable medium and execute on any suitable processor. For example, the devices at environments 10, 20 each may comprise a computer-readable medium such as a random access memory (RAM), coupled to a processor that executes computer-executable program instructions stored in memory. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

While the network 100 shown in FIG. 1 may comprise the Internet, in other embodiments, other networks, such as an intranet, or no network may be used. Moreover, methods may operate within a single device. Devices can be connected to a network 100 as shown. Alternative configurations are of course possible. The devices may also comprise a number of external or internal devices such as a mouse, a CD-ROM, DVD, a keyboard, a display, or other input or output devices. Examples of devices are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media content consuming programs. The server devices may be single computer systems or may be implemented as a network of computers or processors. Examples of a server device are servers, mainframe computers, networked computers, a processor-based device, and similar types of systems and devices.

That which is claimed:

1. A method comprising:
   receiving media content;
   determining a media identifier associated with the media content, the media identifier different from media identifiers associated with other media content;
   sending a request comprising the media identifier to determine whether information associated with the media content is available separately from the media content;
   initiating playback of the media content by a media player;
   in response to receiving an indication that information associated with the media content is available separately from the media content, displaying a notification that the information associated with the media content is available, the notification displayed overlapping a portion of the media content displayed on the display portion of the media player, the notification displayed during at least a portion of the playback of the media content by the media player, wherein an attribute of the notification provides an indication of an amount of the information associated with the media content.

2. The method of claim 1, wherein the notification is audible.

3. The method of claim 1 further comprising providing a link for accessing the information associated with the media content.

4. The method of claim 3, wherein the notification includes the link.

5. The method of claim 4, wherein the link provides access to a dynamically-generated content comprising at least some of the information associated with the media content.

6. The method of claim 4, wherein the link provides access to a dynamically-generated web page that displays at least some of the information associated with the media content.

7. The method of claim 6, wherein the dynamically-generated web page receives additional information to be added to the information associated with the media content.

8. The method of claim 1, wherein the media identifier is selected from the group consisting of a watermark, fingerprint, and embedded metadata.

9. A method comprising:
   receiving media content for use on a media player;
   determining a media identifier associated with the media content, the media identifier different from media identifiers associated with other media content;
   sending a request comprising the media identifier to determine whether information associated with the media content is available separately from the media content; and
   in response to receiving an indication that information associated with the media content is available separately from the media content, displaying a selectable link overlapping a portion of the media content displayed on a display portion of the media player, the selectable link providing an indication that the information associated with the media content is available, wherein an attribute of the link provides an indication of an amount of the information associated with the media content, and selection of the selectable link providing access to the information associated with the media content.

10. The method of claim 9, wherein access to the information associated with the media content is provided on a dynamically-generated web page that displays at least some of the information associated with the media content.

11. The method of claim 9, wherein access to the information associated with the media content is provided within the media player.

12. The method of claim 11, wherein access to the information associated with the media content is provided within a media content display portion of the media player.

13. A method comprising:
   receiving a request identifying media content by a media identifier, the media identifier determined from the media content;
   using the media identifier to determine whether information associated with the media content is available separate from the media content;
   if the information associated with the media content is available, providing an indication that the information associated with the media content is available, the indication usable for providing, during at least a portion of the playing of the media content, a notification that the information associated with the media content is available, wherein an attribute of the notification provides an indication of an amount of the information associated with the media content; and
   upon receiving a request for the information, if providing the information associated with the media content is allowed according to one or more availability restrictions, providing the information associated with the media content.

14. The method of claim 13, wherein the indication is a link for accessing that information.

15. The method of claim 14, wherein the link is a URL address.

16. The method of claim 13, wherein the indication is the information associated with the media content.

17. The method of claim 13, wherein availability of the information associated with the media content is controlled by a content creator.

18. The method of claim 13, wherein availability of the information associated with the media content is dependent upon an identity of a requestor.

19. The method of claim 13, wherein availability of the information associated with the media content is dependent upon a distributor used to access the media content.

20. The method of claim 19, wherein availability of the information associated with the media content is dependent upon existence of a contractual relationship involving the distributor.

21. The method of claim 13 further comprising providing advertising information associated with media content.

22. The method of claim 21, wherein the advertising is identified by a distributor used to access the media content.

23. The method of claim 22 further comprising sharing revenue associated with the advertisement among the distributor, a content owner, and an entity making the information associated with the media content available.

24. The method of claim 13 further comprising:
   receiving additional information for association with the media content on an interface displaying the information associated with the media content; and
   associating the additional information with the media content.

25. A system comprising:

a media identifying component for determining a media identifier associated with media content, the media identifier different from media identifiers associated with other media content;

an information availability component for sending a request comprising the media identifier to determine whether information associated with the media content is available separately from the media content and receiving an indication that information associated with the media content is available separately from the media content;

an outputting component for displaying the media content on the media player, and, in response to receiving the indication, displaying a selectable link overlapping a portion of the media content displayed on the media player, the selectable link providing an indication that information associated with the media content is available, wherein an attribute of the link provides an indication of an amount of the information associated with the media content, and selection of the selectable link providing access to the information associated with the media content.

26. The system of claim 25, wherein a dynamically-generated web page displays the information associated with the media content.

27. The system of claim 25, wherein both the media content and the information associated with the media content are provided within a media content display portion of the media player.

28. A computer-readable medium on which is encoded program code, the program code comprising:

program code for receiving media content;

program code for determining a media identifier associated with the media content, the media identifier different from media identifiers associated with other media content;

program code for sending a request comprising the media identifier to determine whether information associated with the media content is available separately from the media content;

program code for initiating playback of the media content by a media player; and program code for, in response to receiving an indication that information associated with the media content is available separately from the media content, displaying a notification that the information associated with the media content is available, the notification displayed overlapping a portion of the media content displayed on the display portion of the media player, the notification displayed during at least a portion of the playback of the media content by the media player, wherein an attribute of the notification provides an indication of an amount of the information associated with the media content.

* * * * *